United States Patent [19]

Masao

[11] Patent Number: 4,800,660
[45] Date of Patent: Jan. 31, 1989

[54] AUTOMATIC SPEED STAGE CHANGING APPARATUS FOR A WHEEL LOADER

[75] Inventor: Fukuda Masao, Kawagoe, Japan

[73] Assignee: Kabushiki Kaisha Komatsu Seisakusho, Japan

[21] Appl. No.: 138,844

[22] PCT Filed: Apr. 7, 1987

[86] PCT No.: PCT/JP87/00215

§ 371 Date: Nov. 24, 1987

§ 102(e) Date: Nov. 24, 1987

[87] PCT Pub. No.: WO87/06287

PCT Pub. Date: Oct. 22, 1987

[30] Foreign Application Priority Data

Apr. 8, 1986 [JP] Japan .................. 61-52646

[51] Int. Cl.$^4$ .............. E02F 3/00; E02F 9/26
[52] U.S. Cl. .................. 37/118 A; 37/DIG. 1; 414/699
[58] Field of Search ............ 37/4, 118 R, 118 A, 37/124, 126 R, DIG. 1, DIG. 7, DIG. 15; 414/918, 467, 469, 572, 699

[56] References Cited

U.S. PATENT DOCUMENTS

| | | | |
|---|---|---|---|
| 2,855,116 | 10/1958 | Moore | 37/4 |
| 3,060,602 | 10/1962 | Buttenhoff | 37/DIG. 1 |
| 3,283,230 | 11/1966 | Davies et al. | 37/DIG. 1 |
| 3,703,931 | 11/1972 | Page et al. | 37/DIG. 1 |
| 4,332,517 | 6/1982 | Igarashi et al. | 414/699 |

FOREIGN PATENT DOCUMENTS

| | | | |
|---|---|---|---|
| 89544 | 7/1980 | Japan . | |
| 0161128 | 12/1980 | Japan | 37/DIG. 1 |
| 22617 | 5/1983 | Japan . | |
| 054847 | 3/1984 | Japan . | |
| 107663 | 7/1984 | Japan . | |
| 220535 | 12/1984 | Japan . | |
| 0258336 | 12/1985 | Japan | 37/DIG. 1 |
| 0014328 | 1/1986 | Japan | 37/DIG. 1 |
| 0601360 | 4/1978 | U.S.S.R. | 37/DIG. 1 |
| 0663794 | 5/1979 | U.S.S.R. | 37/DIG. 1 |
| 1129301 | 12/1984 | U.S.S.R. | 37/DIG. 1 |
| 1153018 | 4/1985 | U.S.S.R. | 37/DIG. 1 |
| 1176031 | 8/1985 | U.S.S.R. | 37/DIG. 1 |
| 2068890 | 8/1981 | United Kingdom | 37/118 A |

*Primary Examiner*—Eugene H. Eickholt
*Attorney, Agent, or Firm*—Welsh & Katz, Ltd.

[57] ABSTRACT

An automatic speed stage changing apparatus for a wheel loader is intended to control shift-down of the wheel loader when a bucket is caused to plunge into an object to be digged such as a hill-shaped earth mass or the like, and an angle suitable for digging work is previously set with respect to a boom angle and a bucket angle respectively. When both the boom and the bucket assume said set angle during forward movement toward the hill-shaped earth mass, this is detected and thereafter a speed stage is automatically shifted down from the selected existent speed stage to a lower speed stage at which a tractive force is increased in accordance with an output of said detection.

8 Claims, 3 Drawing Sheets

AUTOMATIC SPEED STAGE CHANGING APPARATUS FOR A WHEEL LOADER

TECHNICAL FIELD

The present invention relates to an automatic speed stage changing apparatus for a wheel loader and more particularly to automation relative to shift-down control during digging work.

BACKGROUND ART

Generally, a wheel loader is used for the purpose of digging a hill-shaped earth mass and loading the thus digged earth on a dump truck. FIG. 2 illustrates a series of operation patterns ranging from digging by the wheel loader to loading of digged earth on a truck, and this is a most frequently employed operation pattern which is called V-shaped operation.

To shorten a working time in this V-shaped operation (comprising operations ① to ⑤ as represented by arrow marks), it is required that operations are performed in the following manner.

Namely, the wheel loader 1 moves forwardly toward the hill-shaped earth mass 2 at a second forward movement speed (F 2) (operation ① ) and when it moves close to the hill-shaped earcth mass 2 (by a distance in the range of 0.5 m to 1.0 m), it is caused to plunge into the hill-shaped earth mass 2 at a first forward movement speed (F 1) in order to enhance a trailing force when digging work is conducted (operation ② ). On completion of from the position of digging work at a second rearward movement speed (R 2) (operation ③) and subsequently the direction of movement of the wheel loader 1 is changed so that it moves toward a truck 3 at a high speed of F 2 (operation ④). When loading work of digged earth on the truck 3 is completed, the wheel loader 1 moves away from the truck 3 at a high speed of R 2 (operation ⑤ ).

Heretofore, when the aforesaid operation ① is changed to the aforesaid operation ②, a speed stage should be shifted from F 2 to F 1 and moreover the bucket BK should come in contact with the ground, as shown in FIG. 4. However, this handling is very troublesome.

Namely, due to the fact that a boom lever 4 is grasped by an operator's right hand and a steering handle 5 is grasped by his left hand as shown in FIG. 3, the left hand should be parted away from the handle 5 at a time forward movement when a speed stage is shifted from F2 to F1. However, this handling is dangerous and troublesome. Since this handling is troublesome in this way, sometimes an execution of shift-down is forgotten or shift-down is executed after the wheel loader plunges into the hill-shaped earth mass, because he pays much attention to contact of the bucket with the ground.

When an execution of shift-down is forgotten, smooth scooping can not be effected due to reduced tractive force and thereby a sufficient amount of digged earth can not be scooped by the bucket. Further, when shift-down is executed with delay, a time for which a driving force is not temporalily exerted is developed with the result that a body of the wheel loader is pushed back, an operator feels unpleasant or smooth scooping can not be carried out.

The present invention has been made with the foregoing background in mind and its object resides in providing an automatic speed changing apparatus for a wheel loader which assures that shift-down is automatically executed during digging work and handling of an operator can be reduced.

DISCLOSURE OF THE INVENTION

Namely, the present invention takes into account the fact that during V-shaped operation the bottom of the bucket comes in contact with the ground while maintaining its horizontal posture only when the bucket is ready to plunge into a hill-shaped earth mass. The boom and the bucket are provided with detecting means for detecting that their predetermined angle is reached respectively, and when both the boom and the bucket detect with the aid of these detecting means that the aforesaid predetermined angle is reached, a speed stage is automatically shifted down to a lower speed stage. This is effective for reducing an operator's handling just before the bucket plunges into the hill-shaped earth mass.

Further, according to the present invention the aforesaid automatic shift-down is released when the speed stage represents movement of the wheel loader, for instance, rearward movement other than forward movement, and thereafter the speed stage is automatically restored from the aforesaid lower speed stage to a certain specified speed stage. This causes to an operator's handling to be reduced at a time of rearward movement after completion of digging work.

BEST MODE FOR CARRYING OUT THE INVENTION

Figure 1:
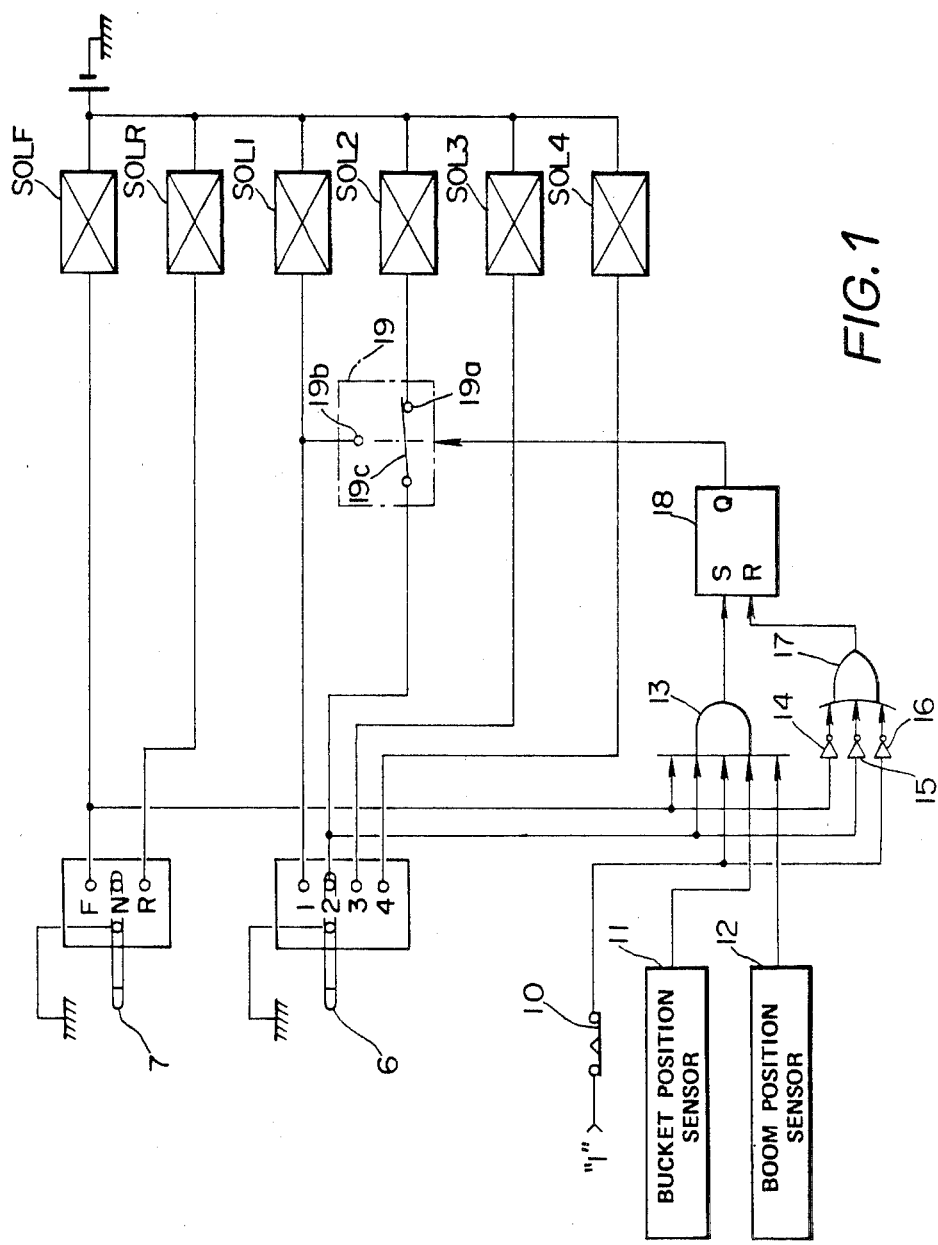
FIG. 1 is a circuit diagram illustrating an embodiment of the present invention.

Now, the present invention will be described in a greater detail hereunder with reference to the accompanying drawings. FIG. 1 is a circuit diagram illustrating an embodiment of the present invention. It should be noted that a transmission which is employed for this embodiment determines its speed stage in response to an electrical signal representative of one of speed stages (four speeds for forward and rearward movements).

In FIG. 1 a directional lever 7 is a lever for selecting forward movement F, neutral state N or rearward movement R and a range lever 6 is a lever for selecting speed stages (first speed stage, second speed stage, third speed stage and fourth speed stage) in the forward movement F or the rearward movement R. Incidentaly, the range lever 6 and the directional lever 7 are hereinafter generally referred to as a transmission lever.

When the directional lever 7 is shifted to the forward movement F, a solenoid SOL F is energized and ther transmission (not shown in the drawing) is brought in a forward movement state. On the other hand, when the directional lever 7 is shifted to the rearward movement R, a solenoid SOL R is energized and the transmission is brought in a rearward movement state.

Similarly, when the range lever 6 is shifted to the first speed stage, the second speed stage, the third speed stage or the fourth speed stage, solenoid SOL 1, SOL 2, SOL 3 or SOL 4 is energized and the transmission is brought in the first speed stage, the second speed stage, the third speed stage or the fourth speed stage.

Namely, by handling the range lever 6 and the directional lever 7, four forward speed stages and four rearward speed stages, that is, eight speed stages in total are selected.

Next, description will be made below as to components which are added in accordance with the present invention.

The aforesaid added components comprise a cancel button 10, a bucket position detecting sensor 11, a boom position detection sensor 12, and AND circuit 13, inverters 14, 15 and 16, an OR circuit 17, a flip-flop 18 and a shifting switch 19.

Figure 3:
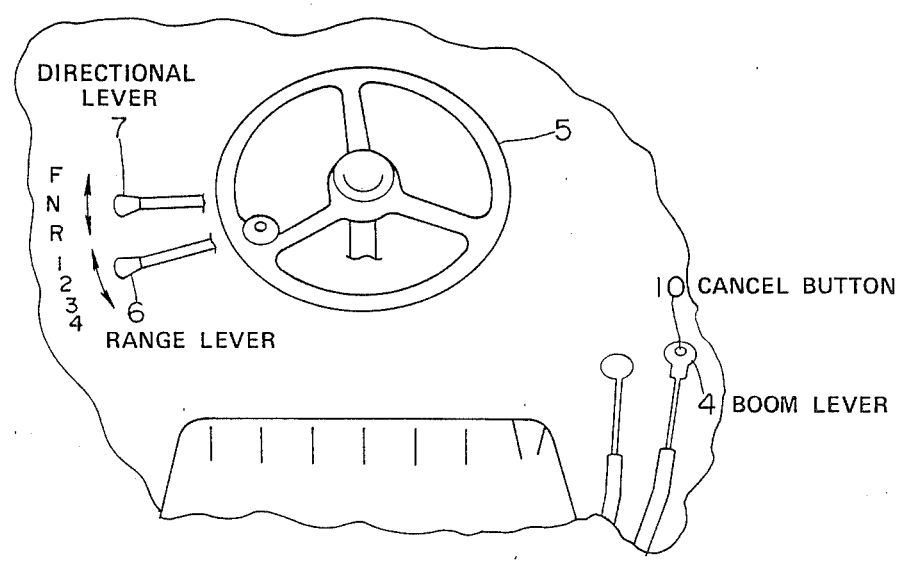
FIG. 3 is a view illustrating an area in the operator's cabin of the wheel loader.

The cancel button 10 is handled in the case where the existent speed change is canceled and it is located, for intance, on a grip of the boom lever 4 as shown in FIG. 3. Normally, the cancel button 10 addes a signal "1" to the AND circuit 13 and the inverter 16, and when it is handled manually with the use of the button, it addes a signal "0" to the AND circuit 13 and the inverter 16.

The bucket position detecting sensor 11 and the boom position detecting sensor 12 are adapted to detect that the bucket and the boom assume a predetermined bucket angle and a predetermined boom angle. Concretely, they detect their specific elongated position of a bucket cylinder and a boom cylinder and at a time of their detection a signal "1" is outputted to AND circuit 13. They are constructed by using, for instance, a limit switch, an encoder for detecting a turning angle or the like. In the case where limit switches are used, they are located in such a manner that they are turned on when the cylinder assumes a specific elongated position. In the case where an encoder is used, a turning angle (preset angle) which is obtained when the cylinder assumes a specific elongated position is used as a comparative reference.

Figure 4:
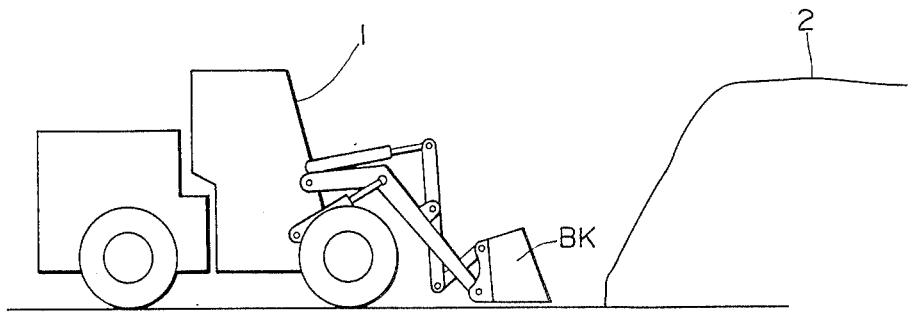
FIG. 4 is a view illustrating the wheel loader just before it plunges into a hill-shaped earth mass.

Here, the specific elongated position for the bucket cylinder and the boom cylinder represents, for instance, a position which is assumed by the cylinder when the bottom surface of the bucket comes in contact with the ground and the bucket is oriented horizontally, as shown in FIG. 4.

Further, in association with handling of the directional lever 7, when the directional lever 7 assumes the position of forward movement F, a signal "1" is transmitted to the AND circuit 13 and the inverter 14, and in association of handling of the range lever 6, when the range lever 6 assumes the position of second speed, a signal "1" is transmitted to the AND circuit 13 and the inverter 15.

When the AND circuit 13 takes AND conditions relative to the aforesaid five input signals and thereby the AND conditions are established, a signal "1" is added to a set input S of the flip-flop 18. Further, when the OR circuit 17 takes OR conditions relative to the aforesaid three inverters 14, 15 and 16 and a signal "1" is added from either one of the inverters, the signal "1" is added to the reset input R of the flip-flop 18.

When a signal "1" is added to the set input S, the flip-flop 18 is set and the signal "1" is outputted to the shift switch 19 from an output terminal Q whereby a movable contact piece 19c in the shift switch 19 is connected to a contact point 19b. Further, when a signal "1" is added to a reset input R, the flip-flop 18 is reset and a signal "0" is outputted to the shift switch 19 from the output terminal Q and the movable contact piece 19c of the shift switch 19 is connected to a contact point 19a.

Next, description will be made below as to functions of the present invention in relation to operation of a wheel loader.

Figure 2:
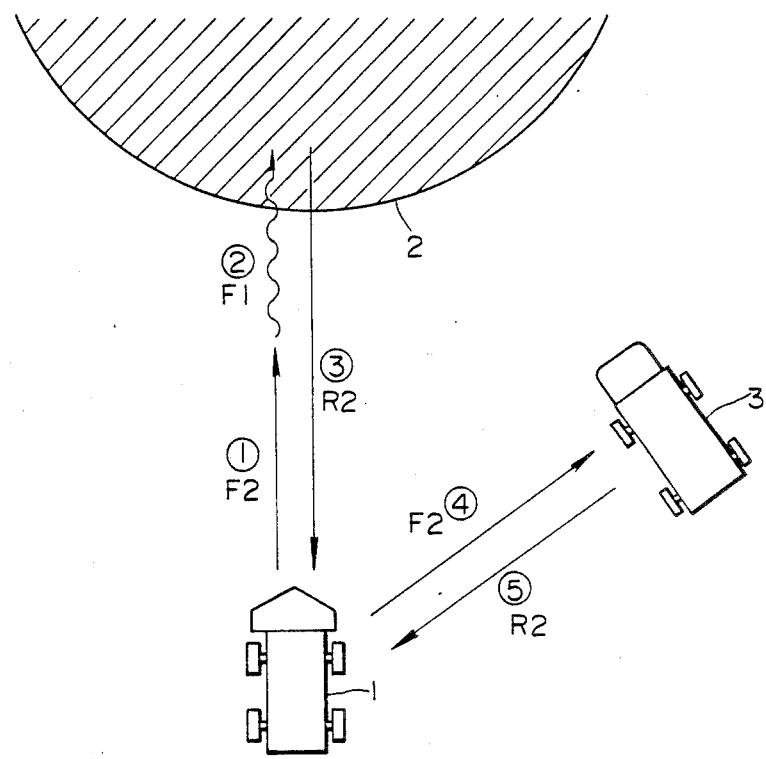
FIG. 2 is a view which is used for the purpose of illustrating a V-shaped operation of the wheel loader.

First, during operation ① in the V-shaped operations (see FIG. 2) an operator handles the range lever 6 and the directional lever 7 and thereby the wheel loader moves at a second forward speed. At this moment, the operator has previously handled the bucket lever in order that the bucket cylinder assumes the aforesaid specific elongated position. Thus, a signal "1" is outputted from the bucket position detection sensor 11.

As the wheel loader 1 moves close to a hill-shaped earth block 2, the operator handles the boom lever 4 in order that the boom cylinder assumes the aforesaid specific elongated position. Thus, the bucket comes in contact the ground surface. This causes a signal "1" to be outputted from the boom position detecting sensor 13 and whereby AND conditions of the AND circuit 13 are established and the flip-flop 18 is set.

When the flip-flop 18 is set, the movable contact piece 19c is shifted from the contact point 19a to the contact point 19b. As a result, the solenoid SOL 2 is deenergized and the solenoid SOL 1 is energized regardless of the fact that the range lever 6 selects a second speed stage whereby speed stage is shifted from the second speed to the first speed stage.

Namely, when the bucket is ready to plunge into the hill-shaped earth mass by handling the boom lever 4, speed stage is automatically shifted down to the first speed and thereby tracting force is caused to increase.

Once the flip-flop 18 has been set, the flip-flop 18 is not reset during the digging operation irrespective of how the position of the bucket and the position of the boom vary, and the first speed continues to be maintained.

The conditions that the flip-flop 18 is reset are established when the directional lever 7 assumes the position other than forward movement F, when the range lever 6 assumes the position of speed stage other than second speed stage and when the cancel button 10 is depressed.

Usually, after the completion of digging operation the wheel loader moves backwardly away from the hill-shaped earth mass at a second rearward movement speed. In this case, however, when the directional lever 7 assumes the position of rearward movement R, the flip-flop 18 is reset in the above-described manner. This causes the movable contact piece 19c in the shifting switch 19 to be shifted from the contact point 19b to the contact point 19a, and the second speed stage which has been selected by the range lever 6 at present is selected. Namely, heretofore, at a time of rearward movement after the completion of the digging work, the second rearward movement speed should be selected by simultaneously handling both the directional lever 7 and the range lever 6. However, in the above-described embodiment an operator can shift to the second rearward movement speed merely by handling the directional lever 7.

It should be noted that at a time of operations other than the V-shaped operation (at a time of operation for ground levelling or the like) the bucket may come in contact with the ground and be oriented in the horizontal direction but in this case it suffices that the cancel buttom 10 is previously depressed in order to assure that no shift-down takes place automatically.

Further, a case where the upper part of the hill-shaped earth mass is to be scraped off is developed in dependence on the state of work in site. In this case it suffices that a detected bucket position and a detected boom position in the bucket position detecting sensor 11 and the boom position detecting sensor 12 are corrected adequately.

The illustrated embodiment of the present invention has been described above with respect to the case where two levers, that is, the directional lever and the range lever are employed as a transmission lever. However, the present invention can be applied to the case where a single lever is employed as a transmission lever. Further, it is possible to apply the present invention to any one of manual-shift vehicle, automatic-shift vehicle and manual/automatic shift vehicle, provided that an electric transmission control is employed.

INDUSTRIAL APPLICABILITY

As is apparent from the above description, an automatic speed stage changing apparatus for a wheel loader in accordance with the present invention can be employed for digging and loading works with the aid of the V-shaped operation and moreover it can be advantageously employed for ordinary digging works.

I claim:

1. An automatic speed stage changing apparatus for a wheel loader including a bucket and a boom, characterized in that said apparatus comprises:
   speed signal generating means for generating a signal representative of a speed stage,
   speed stage selecting means for electrically selecting a speed stage of a transmission adapted to come in engagement in response to said speed stage signal,
   first detecting means for detecting that the boom assumes a predetermined boom angle suitable for digging work,
   second detecting means for detecting that the bucket assumes a predetermined bucket angle suitable for digging work, and
   shifting means adapted to output a signal of a predetermined lower speed stage in place of the signal outputted from said speed stage signal generating means when detecting signals are outputted from both said first and second detecting means.

2. An automatic speed stage changing apparatus for a wheel loader as claimed in claim 1, characterized in that when an output signal of the speed stage signal generating means represents movement other than forward movement, said shifting means is released by said shifting means and inputs an output signal of the speed stage signal generating means into said speed stage selecting means.

3. An automatic speed stage changing apparatus for a wheel loader, as claimed in claim 1, characterized in that said apparatus further includes a cancel buttom for releasing said shifting operation which is performed by said shifting means, and when this cancel button is actuated, an output signal of the speed stage signal generating means is inputted into said speed stage selecting means.

4. An automatic speed stage changing apparatus for a wheel loader as claimed in claim 1, characterized in that the shifting operation to be performed by said shifting means is performed only when an output signal of the speed stage generating means represents a predetermined speed stage of forward movement.

5. An automatic speed stage changing apparatus for a wheel loader as claimed in claim 1, characterized in that the lower speed stage to be shifted by said shifting means is a first speed.

6. An automatic speed stage changing apparatus for a wheel loader as claimed in claim 4, characterized in that said predetermined speed stage is a second speed and a lower speed stage to be shifted by said shifting means is a first speed.

7. An automatic speed stage changing apparatus for a wheel loader as claimed in claim 1, characterized in that said speed stage signal generating means includes a first lever for selecting forward movement, neutral state and rearward movement and a second lever for selecting a speed stage, and
   said shifting means includes an AND circuit for taking a logical sum of a detected signal of said first detecting means and a detected signal of said second detecting means, an OR circuit for taking a logical sum of a logically inverted signal relative to the forward movement selection signal of said first lever and a logically inverted signal relative to a second speed stage selection signal of said second lever, a flip-flop circuit adapted to be set by an output of said AND circuit and reset by an output of said OR circuit and a shift switch for shifting the second speed stage selection signal of the second lever to a first speed speed stage selection signal in response to an output of said flip-flop circuit and then inputting said first speed stage selection signal into said speed stage selection means.

8. An automatic speed stage changing apparatus for a wheel loader as claimed in claim 3, characterized in that said speed stage signal generating means includes a first lever for selecting forward movement, neutral state and rearward movement and a second lever for selecting a speed stage, and
   said shifting means includes an AND circuit for taking a logical sum of a forward movement selection signal of the first lever, a second speed stage selection signal of the second lever, a signal representative of the fact that the cancel button is not actuated, a detection signal of the first detecting means and a detection signal of the second detecting means, an OR circuit for taking a logically inverted signal relative to the forwartd movement selection signal of said first lever, a logically inverted signal relative to the second speed stage selection signal of said second lever and a signal representative of the fact that the cancel button is actuated, a flip-flop circuit adapted to be set in response to an output of said AND circuit and reset by in response to an output of said OR circuit and a shift switch for shifting the second speed stage selection signal of the second lever to the first speed stage selection signal by an output of said flip-flop circuit and then inputting the first speed stage selection signal into said speed stage selecting means.

* * * * *

UNITED STATES PATENT AND TRADEMARK OFFICE
CERTIFICATE OF CORRECTION

PATENT NO. : 4,800,660

DATED : January 31, 1989

INVENTOR(S) : Masao Fukuda

It is certified that error appears in the above-identified patent and that said Letters Patent is hereby corrected as shown below:

On the title page, Item [19], "Masao" should read -- Fukuda --.

Item [75], "Fukuda Masao" should read -- Masao Fukuda --.

Signed and Sealed this

Fifteenth Day of August, 1989

Attest:

DONALD J. QUIGG

*Attesting Officer*  Commissioner of Patents and Trademarks